United States Patent Office 3,370,108
Patented Feb. 20, 1968

3,370,108
O-ETHYL-O-PHENYL-S-(N-METHOXY-N-ISO-PROPYLACETAMIDO)-DITHIOPHOSPHATE
Sidney B. Richter, Chicago, Ill., assignor to Velsicol Chemical Corporation, Chicago, Ill., a corporation of Illinois
No Drawing. Filed Aug. 11, 1964, Ser. No. 388,942
1 Claim. (Cl. 260—943)

ABSTRACT OF THE DISCLOSURE

The compound O-ethyl-O-phenyl-S-(N-methoxy-N-isopropylacetamido)-dithiophosphate useful as a herbicide.

This invention relates to new chemical compositions of matter. More specifically, this invention relates to a new chemical compound, O-ethyl-O-phenyl-S-(N-methoxy - N - isopropylacetamido) - dithiophosphate, having the formula

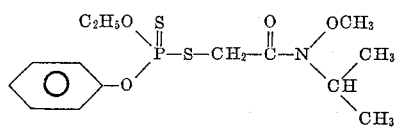

This new chemical compound is useful as a herbicide.

The new compound of the present invention can be prepared by the reaction of N-isopropyl-N-methoxy-2-chloroacetamide with an alkali metal salt of O-ethyl-O-phenyl dithiophosphoric acid. The N-isopropyl-N-methoxy-2-chloroacetamide can be prepared from the chloroacetyl chloride by treatment with N-isopropyl-O-methylhydroxylamine which can be synthesized by the method described by Jones and Major, 52, J. A. C. S. 669–79 (1930). The above reaction of the amide with the salt takes place readily by contacting the amide with an amount of the alkali metal salt greater than the molecularly equivalent quantity of the amide in the presence of a suitable solvent or diluent such as benzene. The reaction mixture is heated for several hours preferably at reflux. After the reaction is completed, the mixture is filtered, washed with water, dried and the solvent distilled off in vacuo to recover the crude product as the residue. This crude product is sufficiently pure for use as a herbicide, but if desired the product can be purified by means comcon to the art such as chromatography.

The manner in which the compound of the present invention can be prepared is illustrated in the following examples:

EXAMPLE 1

*Preparation of N-methoxy-N-isopropyl 2-chloroacetamide*

N-isopropyl-O-methylhydroxylamine (63 g.; 0.5 mole) and chloroacetyl chloride (56.5 g.; 0.5 mole) were dissolved in benzene (200 ml.) and cooled in ice water. Triethylamine (111 g.; 1.1 moles) was added to the reaction mixture with stirring and cooling over a 1 hour period. The stirring and cooling was continued for an additional 2 hours and then the reaction mixture was filtered. The filter cake was washed with a large amount of benzene. The filtrate and washings were combined and washed twice with water, once with 10% sodium carbonate (200 ml.) and then three additional times with water. The solution was dried over magnesium sulfate and filtered. The solvent was evaporated off and the remaining solution was distilled in vacuo to yield the product N-methoxy-N-isopropyl 2-chloroacetamide.

EXAMPLE 2

*Preparation of potassium salt of O-ethyl-O-phenyl dithiophosphoric acid*

85% potassium hydroxide (26 g.; 0.4 mole) was dissolved in absolute ethanol (250 ml.) and saturated with hydrogen sulfide. The reaction mixture was cooled initially and then O-ethyl-O-phenyl chlorothiophosphate (46 g.; 0.194 mole) was added slowly. A precipitate formed immediately. The mixture was refluxed for 3 hours and more precipitate formed. The precipitate was filtered and washed with alcohol and discarded. The filtrate and washings were combined and evaporated down on a water pump, adding benzene to facilitate evaporation. The solution was concentrated to the point where considerable precipitate was present. The mixture was diluted with benzene, filtered, washed well with benzene, and dried. The filtrate was discarded and the remaining solid was the product, potassium O-ethyl-O-phenyl dithiophosphate.

EXAMPLE 3

*Preparation of O-ethyl-O-phenyl-S-(N-methoxy-N-isopropylacetamido)-dithiophosphate*

Potassium salt of O-ethyl-O-phenyl dithiophosphate (8 g.; 0.03 mole), N-methoxy-N-isopropyl 2-chloroacetamide (5 g.; 0.03 mole) and benzene (100 ml.) were placed in a 250 ml. three-necked, round bottom flask equipped with a mechanical stirrer and a reflux condenser. The reaction mixture was heated to, and maintained at reflux with stirring for about 23 hours. The reaction mixture was cooled to room temperature and filtered. The filtrate was washed three times with water, dried over magnesium sulfate, and filtered. The solvent was evaporated off to yield the compound, O-ethyl-O-phenyl-S-(N-methoxy-N-isopropylacetamido)-dithiophosphate, of the formula:

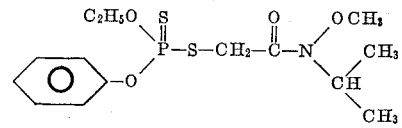

having an index of refraction at 26° C. $N_D = 1.5367$ and the following elemental analysis:

Analysis for $C_{14}H_{22}O_4S_2PN$.—Theoretical: N, 4.19%; P, 7.52%. Found: N, 3.86%; P, 8.55%.

For practical use as herbicides, the compound of this invention is generally incorporated into herbicidal compositions which comprise an inert carrier and a herbicidally toxic amount of the compound. Such herbicidal compositions, which are usually known in the art as formulations, enable the active compound to be applied conveniently to the site of the weed infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

The active compound is sufficiently soluble in common organic solvents such as kerosene or xylene so that it can be used directly as a solution in these solvents. However, preferred liquid herbicidal compositions are emulsifiable concentrates, which comprise the active compound according to this invention and as the inert carrier, a solvent and an emulsifier. Such emulsifiable concentrates can be diluted with water to any desired concentration of active compound for application as sprays to the site of the weed infestation. The emulsifiers most commonly used in these concentrates are nonionic or mixtures of nonionic with anionic surface-active agents.

A typical herbicidal composition according to this invention is illustrated by the following example, in which the quantities are in parts by weight.

EXAMPLE 4

*Preparation of a dust*

| | |
|---|---|
| O-ethyl-O-phenyl-S-(N-methoxy-N-isopropylacetamido)-dithiophosphate | 10 |
| Powdered talc | 90 |

The above ingredients are mixed in a mechanical grinder-blender and are ground until a homogeneous, free-flowing dust of the desired particle size is obtained. This dust is suitable for direct application to the site of the weed infestation.

The herbicide of this invention can be applied in any manner recognized by the art. The concentration of the new compound of this invention in the herbicidal compositions will vary greatly with the type of formulation and the purpose for which it is designed, but generally the herbicidal compositions will comprise from about 0.05 to about 95 percent by weight of the active compound of this invention. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as pigweed, lambsquarters, yellow foxtail, crabgrass, wild mustard, Frenchweed, ryegrass, goose-grass, chickweed, and smartweed, biennials such as wild carrot, great burdock, mullein, round-leaved mallow, blue thistle, bull thistle, houndstongue, moth mullein, and purple star thistle; or perennials such as white cockle, perennial rye-grass, quackgrass, Johnson grass, Canada thistle, hedge bindweed, Bermuda grass, sheep sorrel, field chickweed, and wintercress. Similarly, such weeds can be classified as broadleaf or grassy weeds. It is economically desirable to control the growth of such weeds without damaging beneficial plants or livestock.

The new compound of this invention is particularly valuable for weed control because it is toxic to many species and groups of weeds while it is relatively nontoxic to many beneficial plants. The method of this invention for the control of undesirable plant life which comprises contacting the locus of the undesirable plant infestation with a herbicidal composition comprising an inert carrier and as the essential active ingredient, in a quantity which is herbicidally toxic to said undesirable plant life, the compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The toxicity of the compound of this invention to weeds can be demonstrated by a variety of testing techniques known to the art. In one series of experiments to show the preemergence activity of the compound of this invention, it was formulated as an aqueous emulsion and sprayed at various dosages on the surface of soil which had been seeded less than twenty-four hours earlier with seeds of crop plants and weeds. After spraying, the soil containers were placed in the greenhouse and provided with supplementary light and heat as required and daily or more frequent watering. The severity of injury to each crop and weed was determined 15 to 20 days after the soil treatments. The severity of injury was rated on a 0 to 10 scale as follows: 0=no injury; 1, 2=slight injury; 3, 4=moderate injury; 5, 6=moderately severe injury; 7, 8, 9=severe injury; 10=death. Some of the results of these tests are presented in the following table:

TABLE 1
[O-ethyl-O-phenyl-S-(N-methoxy-N-isopropylacetamido)-dithiophosphate]

| Weed Species | Concn. (lbs. actual test chemical/acre) | Injury Rating |
|---|---|---|
| Barnyard Grass | ¼ | 9 |
| Do | ½ | 10 |
| Do | 1 | 10 |
| Do | 2 | 10 |
| Crabgrass | ¼ | 9 |
| Do | ½ | 9 |
| Do | 1 | 10 |
| Do | 2 | 10 |
| Foxtail | ¼ | 8 |
| Do | ½ | 9 |
| Do | 1 | 10 |
| Do | 2 | 10 |
| Downy Brome | 8 | 10 |
| Ryegrass | 8 | 10 |
| Wild Oats | 8 | 7 |
| Snapbeans | ¼ | 0 |
| Do | 2 | 0 |
| Do | 4 | 0 |
| Do | 8 | 0 |
| Cotton | ¼ | 0 |
| Do | 2 | 0 |
| Do | 4 | 0 |
| Do | 8 | 1 |
| Peanuts | ¼ | 0 |
| Do | 2 | 0 |
| Do | 4 | 0 |
| Do | 8 | 0 |
| Safflower | ¼ | 0 |
| Do | 2 | 0 |
| Do | 4 | 0 |
| Do | 8 | 0 |
| Soybeans | ¼ | 0 |
| Do | 2 | 0 |
| Do | 4 | 0 |
| Do | 8 | 0 |
| Wheat | ¼ | 0 |
| Do | 2 | 1 |
| Do | 4 | 2 |
| Do | 8 | 5 |

In another series of tests which were to show the postemergent activity of this compound, the test chemical was formulated as an aqueous emulsion and sprayed at various dosages on the foliage of crop plants and weeds that have attained a prescribed size. After being sprayed, the plants were placed in a greenhouse and watered daily or more frequently. Water was not applied to the foilage of treated plants. The severity of injury to each crop and weed was determined thirteen days after the plants were treated. The degree of injury was rated on the same basis as above. At a concentration of 8 lbs./acre, O-ethyl-O-phenyl-S-(N-methoxy-N-isopropylacetamido)-dithiophosphate caused injury to barnyard grass of a severity rated as 8, to crabgrass of a severity rated 9, to mustard of a severity rated as 9, and to ryegrass of a severity rated as 6.

Further tests on O-ethyl-O-phenyl-S-(N-methoxy-N-isopropylacetamido)-dithiophosphate indicate that in addition to the safety this compound has shown to economic crop plants, it also tends to stimulate the growth of the crop plant. The following cultivated crops growing in soil to which the compound of this invention had been applied at relatively low rates were more lush and hardly than were check plants growing in untreated soil: corn, cotton, rice, sorghum, oats, snapbeans, barley, flax and peanuts. This ability of the compound to act as a plant regulator by controlling the growth of undesirable plant life while stimulating the growth of cultivated crops is surprising and unexpected.

I claim:
1. O - ethyl - O - phenyl-S-(N-methoxy-N-isopropyl-acetamido)-dithiophosphate.

References Cited
UNITED STATES PATENTS
3,092,541  6/1963  Beriger _____ 260—943 X CHARLES B. PARKER, *Primary Examiner.*
B. BILLIAN, *Assistant Examiner.*